United States Patent
Costa et al.

(10) Patent No.: US 9,827,852 B2
(45) Date of Patent: Nov. 28, 2017

(54) HOUSING FOR A ROLLING-ELEMENT BEARING AND DRIVE-TRAIN SEGMENT FOR A VEHICLE HAVING THE HOUSING

(71) Applicant: Schaeffler Technologies AG & Co. KG, Herzogenaurach (DE)

(72) Inventors: Jesiel Costa, Sorocaba (BR); Kleberson Sierra, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/034,431

(22) PCT Filed: Oct. 15, 2014

(86) PCT No.: PCT/DE2014/200557
§ 371 (c)(1),
(2) Date: May 4, 2016

(87) PCT Pub. No.: WO2015/067265
PCT Pub. Date: May 14, 2015

(65) Prior Publication Data
US 2016/0280063 A1 Sep. 29, 2016

(30) Foreign Application Priority Data
Nov. 7, 2013 (DE) .................. 10 2013 222 622

(51) Int. Cl.
*B60K 17/24* (2006.01)
*F16C 35/067* (2006.01)
(Continued)

(52) U.S. Cl.
CPC ............ *B60K 17/24* (2013.01); *F16C 23/084* (2013.01); *F16C 35/045* (2013.01);
(Continued)

(58) Field of Classification Search
CPC ............... F16C 23/084; F16C 2226/70; F16C 2226/72; F16C 35/067; F16C 2226/74;
(Continued)

(56) References Cited

U.S. PATENT DOCUMENTS 2,624,643 A * 1/1953 Baumheckel ........... F16C 35/04
384/498
2,902,320 A 9/1959 Leister
(Continued)

FOREIGN PATENT DOCUMENTS

DE 7932611 4/1980
DE 8025770 3/1981
(Continued)

*Primary Examiner* — Marcus Charles
(74) *Attorney, Agent, or Firm* — Volpe and Koenig, P.C.

(57) ABSTRACT

A shaft bearing assembly including a housing, in which a bearing is arranged, is disclosed. The housing includes a first and second flange part. The first and second flange parts can be connected to each other, wherein the two flange parts jointly form a receptacle for the rolling-element bearing, wherein one of the flange parts has at least one securing interface and the other has at least one securing counter-interface, wherein the first and second flange parts can be connected to each other and/or fixed to each other in a positive-locking manner by the securing interface and the securing counter-interface that prevents the two flange parts from detaching from each other in an axial direction established by projecting the axis of rotation of the rolling-element bearing onto the housing. The first and second flange parts are hooked to each other by the securing interface and the securing counter-interface.

8 Claims, 9 Drawing Sheets

(51) Int. Cl.
*F16C 35/04* (2006.01)
*F16C 23/08* (2006.01)

(52) U.S. Cl.
CPC ........ *F16C 35/067* (2013.01); *F16C 2226/70* (2013.01); *F16C 2226/72* (2013.01); *F16C 2226/74* (2013.01); *F16C 2226/80* (2013.01); *F16C 2326/06* (2013.01)

(58) Field of Classification Search
CPC ... F16C 2226/80; F16C 2326/06; F16C 27/06
USPC ........ 384/440–441, 490, 498, 535–536, 539, 384/582
See application file for complete search history.

(56) References Cited

U.S. PATENT DOCUMENTS

| | | | |
|---|---|---|---|
| 2,902,322 A | | 9/1959 | Leister |
| 3,756,675 A | * | 9/1973 | Mangiavacchi ...... F16C 23/084 384/536 |
| 3,890,854 A | * | 6/1975 | Pitner ................. F16C 27/066 384/582 |
| 4,530,609 A | * | 7/1985 | Jasperse ............... B65G 39/09 384/482 |
| 4,648,475 A | * | 3/1987 | Veglia .................. B60K 17/04 180/297 |
| 4,699,530 A | * | 10/1987 | Satoh ................... B60G 15/068 280/124.155 |
| 5,314,255 A | * | 5/1994 | Schwerdt ............. B60K 17/24 384/215 |
| 5,947,251 A | * | 9/1999 | Goins .................. F16D 13/48 384/626 |
| 6,132,099 A | | 10/2000 | Olszewski et al. |
| 6,869,226 B2 | * | 3/2005 | Henkel ................ B60K 17/22 180/381 |
| 7,901,142 B2 | * | 3/2011 | Mathis .................. F16C 27/04 384/535 |
| 8,544,591 B2 | * | 10/2013 | Felchner .............. F16F 1/3849 180/312 |
| 8,840,316 B2 | * | 9/2014 | Montboeuf .......... B60G 15/068 384/607 |
| 9,366,294 B2 | * | 6/2016 | Kim .................... F16C 35/045 |
| 9,511,664 B2 | * | 12/2016 | Mori .................... B60K 17/24 |
| 2004/0218843 A1 | | 11/2004 | Jennes et al. |

FOREIGN PATENT DOCUMENTS

| | | | |
|---|---|---|---|
| DE | 2952638 | 7/1981 | |
| DE | 8407526 | 6/1984 | |
| DE | 19618798 | 11/1997 | |
| DE | 10136127 | 2/2003 | |
| DE | 102008023903 A1 * | 11/2009 | ............ B60K 17/24 |
| DE | 102008023901 | 12/2009 | |
| EP | 0050302 | 4/1982 | |
| EP | 0543777 | 5/1993 | |
| GB | 2066379 | 7/1981 | |
| JP | 11078565 A * | 3/1999 | ............ B60K 17/24 |
| NL | 8102497 | 12/1982 | |

* cited by examiner

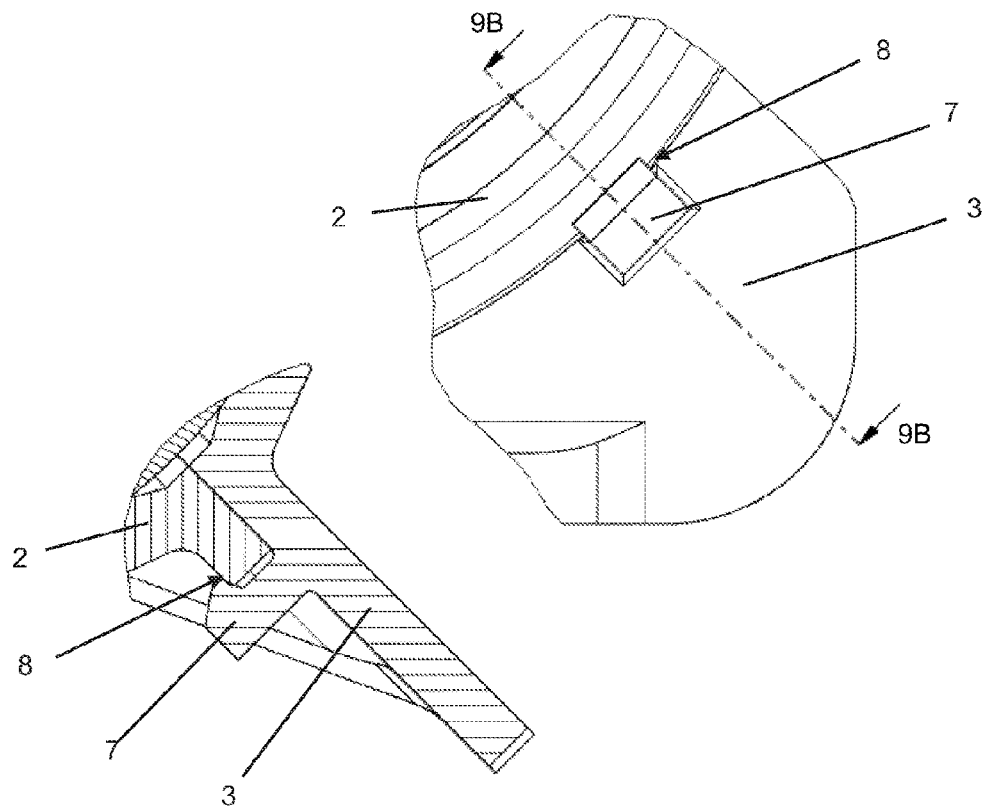

US 9,827,852 B2

HOUSING FOR A ROLLING-ELEMENT BEARING AND DRIVE-TRAIN SEGMENT FOR A VEHICLE HAVING THE HOUSING

CROSS-REFERENCE TO RELATED APPLICATIONS

This application is a 371 application of PCT/DE/2014/200557, filed Oct. 15, 2014, which claims the benefit of German Patent Application No. 102013222622.5, filed Nov. 7, 2013.

BACKGROUND

The invention relates to a drive train portion for a vehicle having a gearbox, a connection shaft, at least one joint, an additional connection shaft and having a shaft bearing arrangement for the connection shaft, wherein the shaft bearing arrangement is arranged in a stationary manner with respect to the gearbox, wherein the connection shaft extends from the gearbox to the joint and is supported in the shaft bearing arrangement, wherein the shaft bearing arrangement comprises a housing in which a roller bearing can be arranged, wherein the housing comprises a first flange portion and a second flange portion, wherein the first and second flange portions can be connected to each other, wherein the two flange portions together form a receiving member for the roller bearing, wherein one of the flange portions has at least one securing interface and the other has at least one securing counter-interface, wherein the first and second flange portions can be connected to each other and/or can be fixed to each other in a positive-locking manner by the securing interface and the securing counter-interface, wherein the positive-locking connection prevents the two flange portions from becoming disengaged from each other in an axial projection direction with respect to the rotation axis of the roller bearing on the housing, wherein the first and second flange portions can be hooked, locked and/or clip-fitted to each other by the securing interface and the securing counter-interface.

Roller bearings are often arranged in housings in order to secure them to a surrounding construction. Housings which have a first and a second flange portion are already known, wherein the two flange portions can be connected to each other.

The publication DE 196 18 798 A1 describes a radial bearing for a drive shaft of vehicles. There is arranged on the drive shaft an inner ring of the radial bearing which is inserted in a position-orientated manner via a spherically constructed covering face of an outer ring in a retention member. The retention member is assembled in a positive-locking manner from two flanges of sheet steel.

The publication DE 80 25 770 U1 discloses a bearing housing having a pressure compensation valve for closed bearing housings, in particular for those which are connected to devices for sealing with respect to lubricant discharge. Upstream of the free end of the bearing housing there is fitted a closure cover which contains a resilient diaphragm which blocks the inner cross-section of the closure cover and which is provided with a number of needle-thin holes and which is in contact with the external air.

The publication DE 84 07 526 U1 describes a power unit for a vehicle having a differential which is located below a gearbox and which is connected to two half-shafts of the same length, wherein the connection of one of the half-shafts to the differential comprises an intermediate shaft which has a bearing close to the half-shaft. The bearing has a roller bearing having an inner ring which is secured to the intermediate shaft, an outer ring and having roller members which are located therebetween. The roller bearing is accommodated in a housing which comprises at least one press-molded piece of sheet metal, and wherein a resiliently deformable elastomer intermediate sleeve connects the housing and the outer roller bearing ring to each other in a rigid manner.

The publication U.S. Pat. No. 2,902,320 A discloses a pillow block housing having a plate pair which are connected to each other in a planar manner with a vertical plate. Each plate comprises a base flange and a reinforcing rib. The reinforcing rib is produced from the metal of the plate. The flanges are complementary.

The publication U.S. Pat. No. 2,902,322 A describes a pillow block housing having a vertical plate pair which provide a housing for a bearing. An outer bearing ring of the bearing cannot be integrated in a fitting manner in the flange housings but instead is surrounded by a bushing.

The publication U.S. Pat. No. 2,624,643 A discloses a pillow block housing, wherein a bearing unit is arranged in the housing. The housing is produced from a pair of identical, integrally pressed steel components. The steel components are connected by rivets, alternatively a weld connection is possible.

DE 10 2008 023 901 A1 discloses a radial bearing for a shaft wherein the radial bearing comprises at least two bearing elements having a retention member for receiving a radial bearing between the at least two bearing elements. Each of the at least two bearing elements comprises at least one securing flange portion for securing the radial bearing.

EP 0 050 302 A1 describes a sealing attachment for a self-aligning bearing housing having a bearing housing. The bearing housing is assembled from two annular housing shells, wherein there are formed on the housing shell snap-fitting beads which snap-fit in snap-fitting grooves of the housing shell and in this manner hold the bearing housing together in a positive-locking and non-positive-locking manner.

DE 29 52 638 A1 describes a plastics material pillow block housing for self-aligning bearings which can be assembled from a lower housing shell and an upper housing shell about the self-aligning bearing, wherein the two bearing housing half-shells engage in each other in a positive-locking manner during assembly. Laterally on the first bearing housing half-shell there are formed resilient snap-fitting members which snap-fit during assembly in corresponding snap-fitting members on the second bearing housing half-shell and produce a positive-locking and non-positive-locking connection of the two bearing housing half-shells.

DE 79 32 611 U1 describes a plastics material self-aligning bearing housing, wherein the bearing housing is assembled from two shell-like housing halves by the first housing half having a round bead which is formed completely around the bearing chamber portion thereof and which has a snap-fitting bead which is arranged at the center of the outer side thereof, while there is formed on the second housing half, completely around the bearing chamber portion thereof, a round groove which corresponds to the round bead and which has a snap-fitting groove which is associated with the snap-fitting bead.

The publication DE 196 18 798 A1, which is the closest prior art, discloses a radial bearing for a drive shaft of vehicles, which connects a drive having a driven front wheel, wherein a laterally sealed radial bearing is inserted in a retention member which is fixed in position at the internal combustion engine side in order to support the drive half-shaft.

SUMMARY

An object of the invention is to provide a shaft bearing arrangement which is reduced in terms of weight and which can be readily produced. This object is achieved with a drive train portion with one or more features of the invention. Preferred or advantageous embodiments of the invention will be appreciated from the following description, claims, and/or the appended figures.

A shaft bearing arrangement for a connection shaft of a drive train portion is provided. The shaft bearing arrangement comprises a housing for a roller bearing, in particular for a rotary bearing and/or radial bearing. Preferably, the roller bearing can be arranged in the housing, in particular integrated therein. Optionally, the shaft bearing arrangement comprises the roller bearing.

It is particularly preferable for the shaft bearing arrangement to be constructed to support a connection shaft of a drive train portion. The drive train portion is constructed, for example, to drive a front or rear wheel of a vehicle, in particular a passenger vehicle or truck. Preferably, the connection shaft, in particular half-shaft, extends from a gearbox to at least one joint of the drive train portion, wherein another connection shaft, for example, a drive shaft for the front or rear wheel of the vehicle, adjoins the joint. The gearbox is optionally constructed as a differential, in particular as a transverse differential.

It is preferable for the shaft bearing arrangement to be arranged between the gearbox and the joint and in particular in a stationary manner on the vehicle, in particular stationary with respect to the gearbox. For example, the shaft bearing arrangement can preferably be fixed via the housing and, optionally in addition, connected and/or fixed to each other. The positive-locking connection prevents the two flange portions from becoming disengaged from each other in an axial projection direction relative to the rotation axis of the roller bearing on the housing. In particular, the first and second flange portions can be connected to each other and/or fixed to each other without tools and/or additional components, in particular without the use and/or the application of additional securing means, such as screws, bolts, rivets, etcetera.

As a result of the positive-locking connection, a simple, rapid and reliable assembly of the first and second flange portion with respect to the housing is enabled. The housing can thereby also be assembled simply and rapidly even with a small structural space. Additional components, in particular additional securing elements, can be dispensed with. This can contribute to reducing an assembly time and saving costs.

The housing comprises a plastic material and/or is formed therefrom. In particular, the first and second flange portions are constructed as complete plastic components. The advantage of this is that the housing can readily be produced, for example, with an injection-molding method. In particular the two flange portions can be constructed freely to an extremely great extent with the securing interfaces and securing counter-interfaces thereof and in one common production step. Additional production steps, for example, shaping operations, as are conventional in particular with metal components, can be dispensed with. As a result of the configuration of the housing from plastic material, it has a relatively small weight, which may have advantageous effects on the fuel consumption in particular when integrated in vehicles.

It is particularly preferable for the securing interface to be formed on one of the flange portions and/or the securing counter-interface to be formed on the other flange portion. Alternatively, the securing interface is integrated in one of the flange portions and/or the securing counter-interface is integrated in the other flange portion. This is in particular possible as a result of the at least partial or complete construction of the flange portions from the plastics material. Preferably, the securing interface and the securing counter-interface in the production of the first and second flange portion, in particular with the injection-molding method, are formed on at least one of the two and/or integrated in at least one of the two. It is thereby possible to dispense with additional components for mutually securing the flange portions. In particular, the number of components can be reduced.

The first and second flange portions can be hooked, locked and/or clip-fitted to each other by the securing interface and the securing counter-interface. For example, the securing interface is constructed as a catch hook or as a clip. Preferably, the securing counter-interface is constructed as an opening and/or aperture in the respective flange portion, wherein the securing interface, in particular in the construction as a catch hook or clip, engages therein or therethrough and/or snap-fits therein. Alternatively or optionally additionally, the securing counter-interface is constructed as a counter-contour with respect to the securing interface, for example, as an edge portion and/or as an outer contour of the corresponding flange portion.

In a preferred embodiment of the invention, the first flange portion has a first receiving portion having a first receiving contour. Optionally, the second flange portion has a second receiving portion with a second receiving contour. When the two flange portions are connected, the first and second receiving portions preferably complement each other and together form the receiving member for the roller bearing. In particular, the first and second receiving portions in the connected state of the two flange portions are congruent in an axial projection direction with respect to the rotation axis of the roller bearing on the housing and/or arranged directly one behind the other and/or merge into each other without any transition.

BRIEF DESCRIPTION OF THE DRAWINGS

FIG. 9A is an enlarged detail of a portion of FIG. 8, and FIG. 9B is a cross-sectional view taken along line 9B-9B in FIG. 9A.

DETAILED DESCRIPTION OF THE PREFERRED EMBODIMENTS

Figure 1:
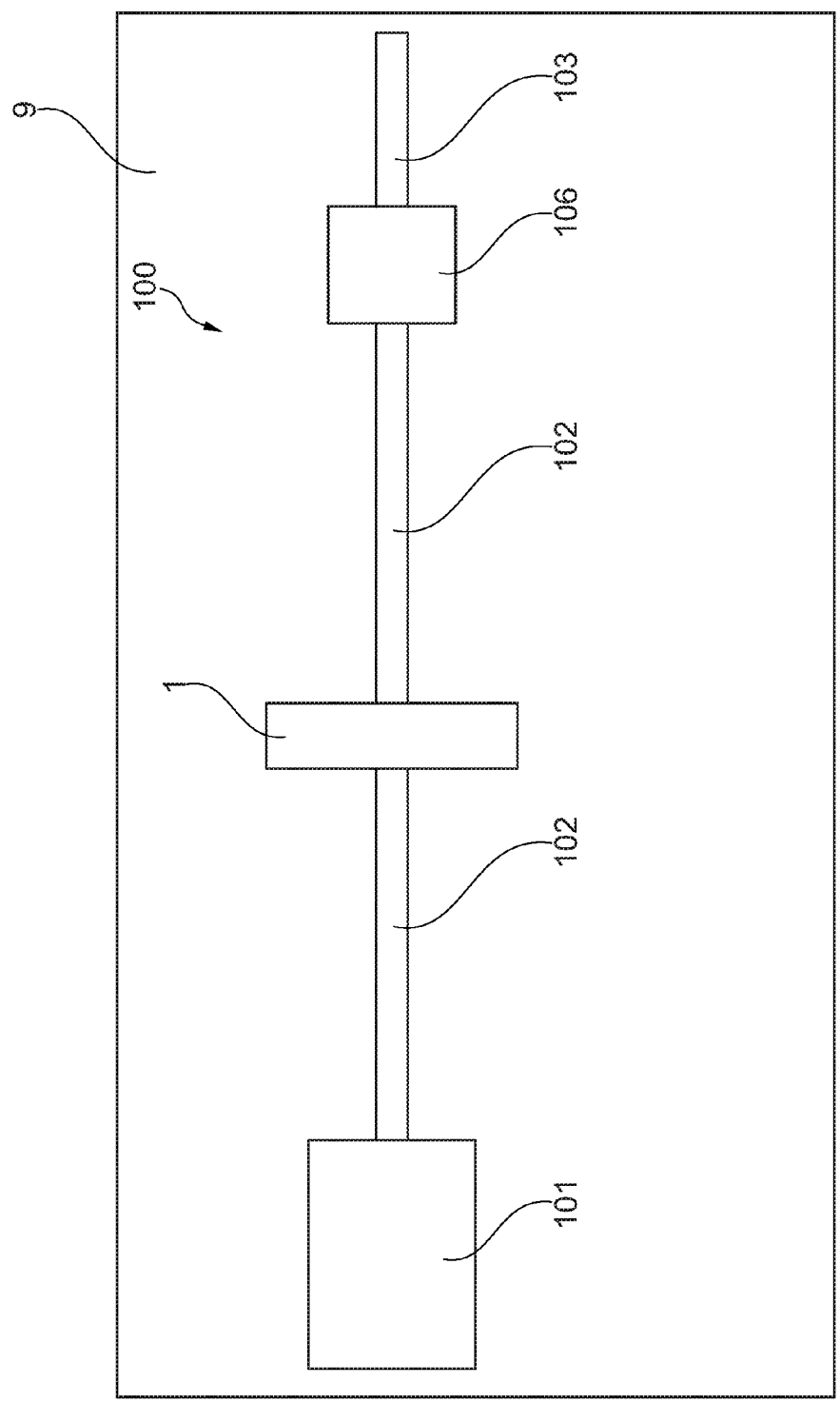
FIG. 1 is a schematic view of a drivetrain portion.
Figure 2:
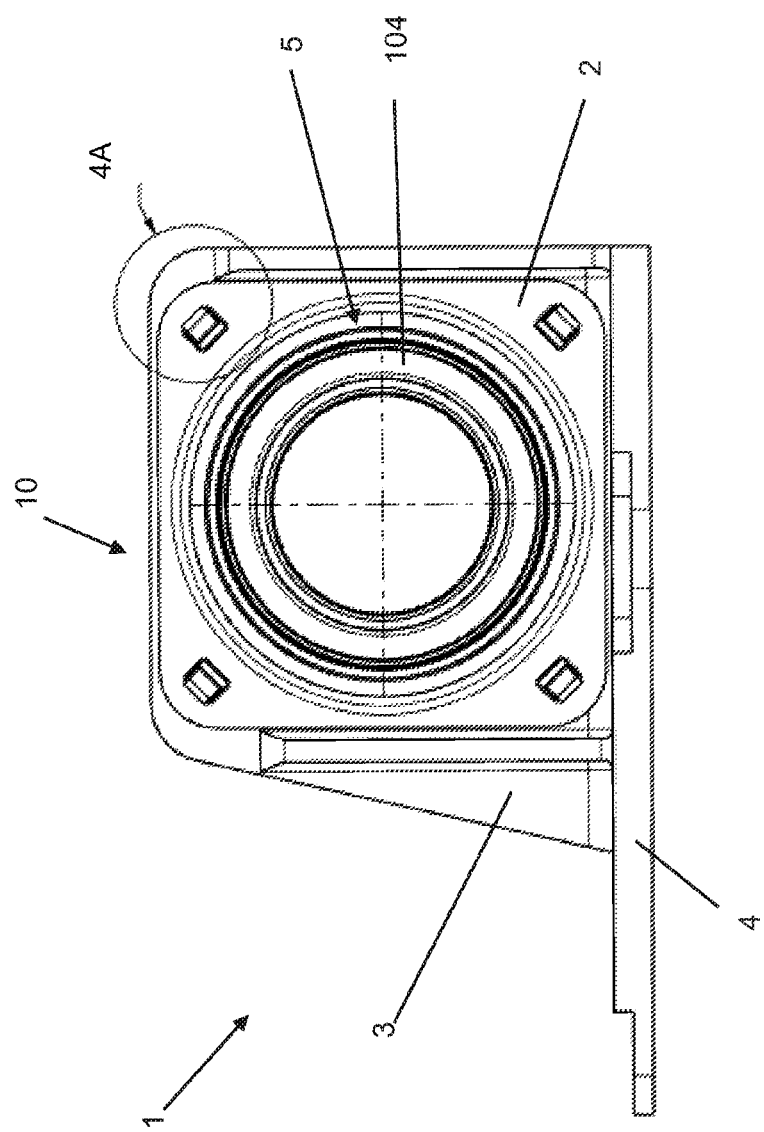
FIG. 2 is an elevational view of a shaft bearing arrangement with a housing.

As shown in FIG. 1, a drive train portion 100 for a vehicle having a gearbox 101, a connection shaft 102, at least one joint 106, an additional connection shaft 103 and having a shaft bearing arrangement 1 for the connection shaft 102 is shown. The shaft bearing arrangement 1 is arranged in a stationary manner with respect to the gearbox 101, and the connection shaft 102 extends from the gearbox to the joint 106 and is supported in the shaft bearing arrangement 1.

As shown in FIGS. 2, 3, 4A and 4B, in one embodiment the shaft bearing arrangement (comprises a housing 10 in which a roller bearing 104 can be arranged. The housing 10 comprises a first flange portion 2 and a second flange portion 3. The first and second flange portions 2; 3 can be connected to each other, and the two flange portions 2; 3 together form a receiving member 5 for the roller bearing 104.

One of the flange portions 2; 3 has at least one securing interface 7 and the other has at least one securing counter-interface 8. The first and second flange portions 2; 3 can be connected to each other and/or can be fixed to each other in a positive-locking manner by the securing interface 7 and the securing counter-interface 8, and the positive-locking connection prevents the two flange portions from becoming disengaged from each other in an axial projection direction with respect to the rotation axis of the roller bearing 104 on the housing 10.

Figure 8:
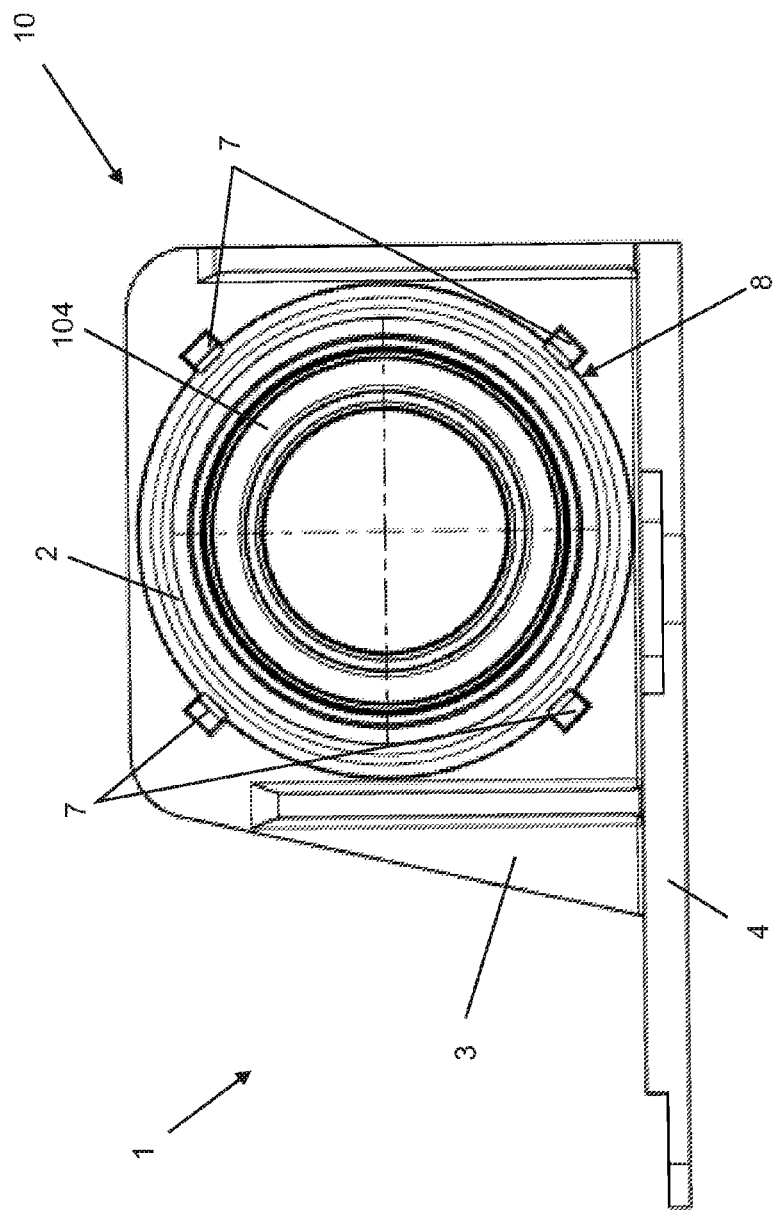
FIG. 8 is an elevational view of a shaft bearing arrangement with a further alternate housing.

The first and second flange portions 2; 3 can be hooked, locked and/or clip-fitted to each other by the securing interface 7 and the securing counter-interface 8. The embodiments of the housing 10 in FIGS. 5, 6, 7A and 7B as well as in FIGS. 8, 9A and 9B show alternate arrangements of the at least one securing interface 7 and the other has at least one securing counter-interface 8.

The housing 10 comprises a plastics material and/or is formed therefrom.

The securing interface 7 is formed on and/or integrated in one of the flange portions 2; 3 and the securing counter-interface 8 is formed on and/or integrated in the other flange portion 2; 3. See FIGS. 2-9B.

Figure 3:
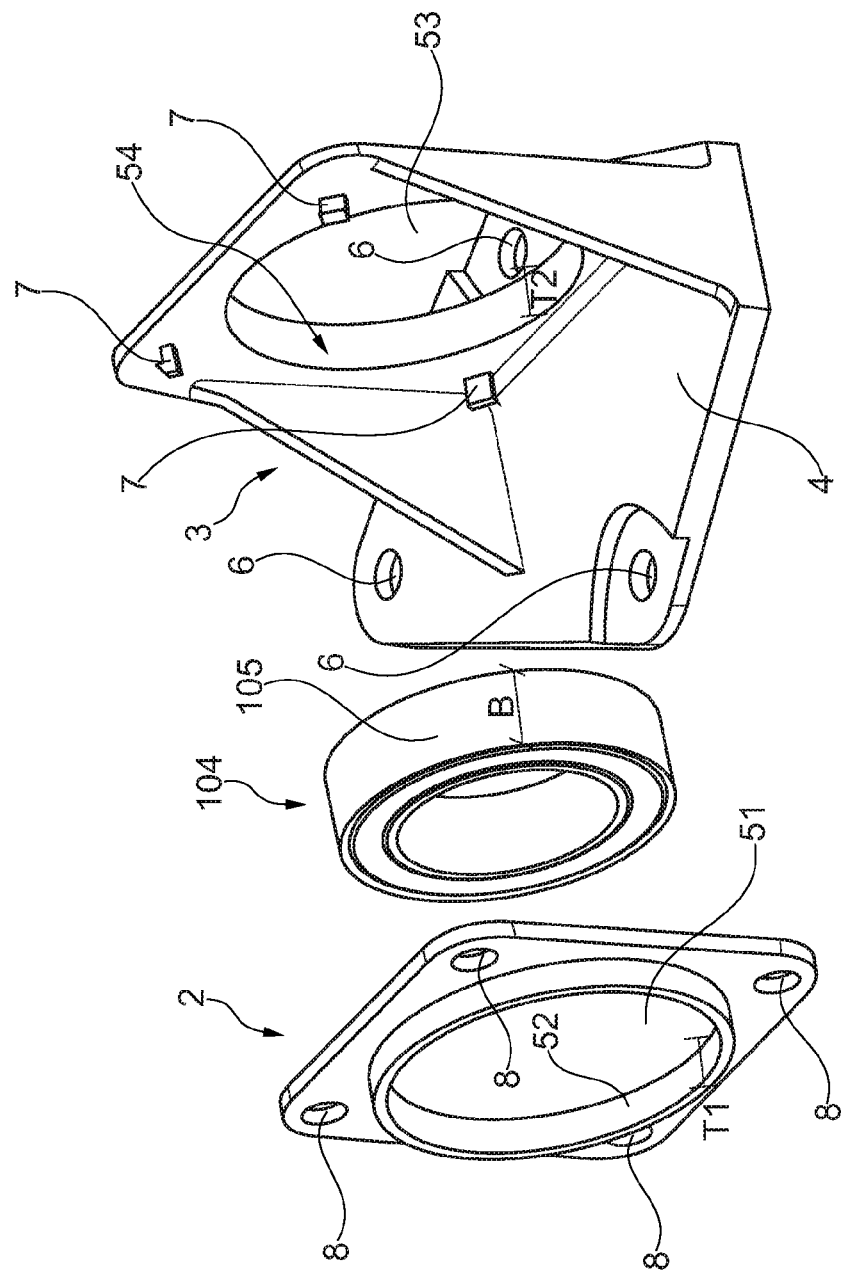
FIG. 3 is an exploded perspective view of the shaft bearing arrangement and housing of FIG. 2.
Figure 4:
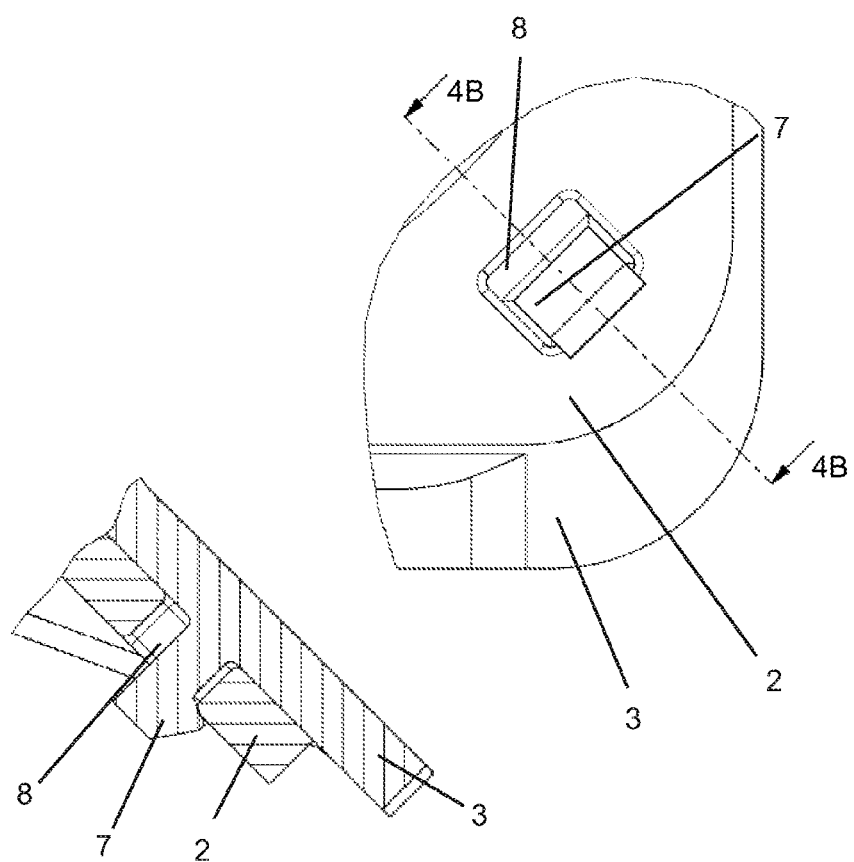
FIG. 4A is an enlarged detail view of section 4A from FIG. 2.
FIG. 4B is a cross-sectional view taken along line 4B-4B in FIG. 4A.
Figure 5:
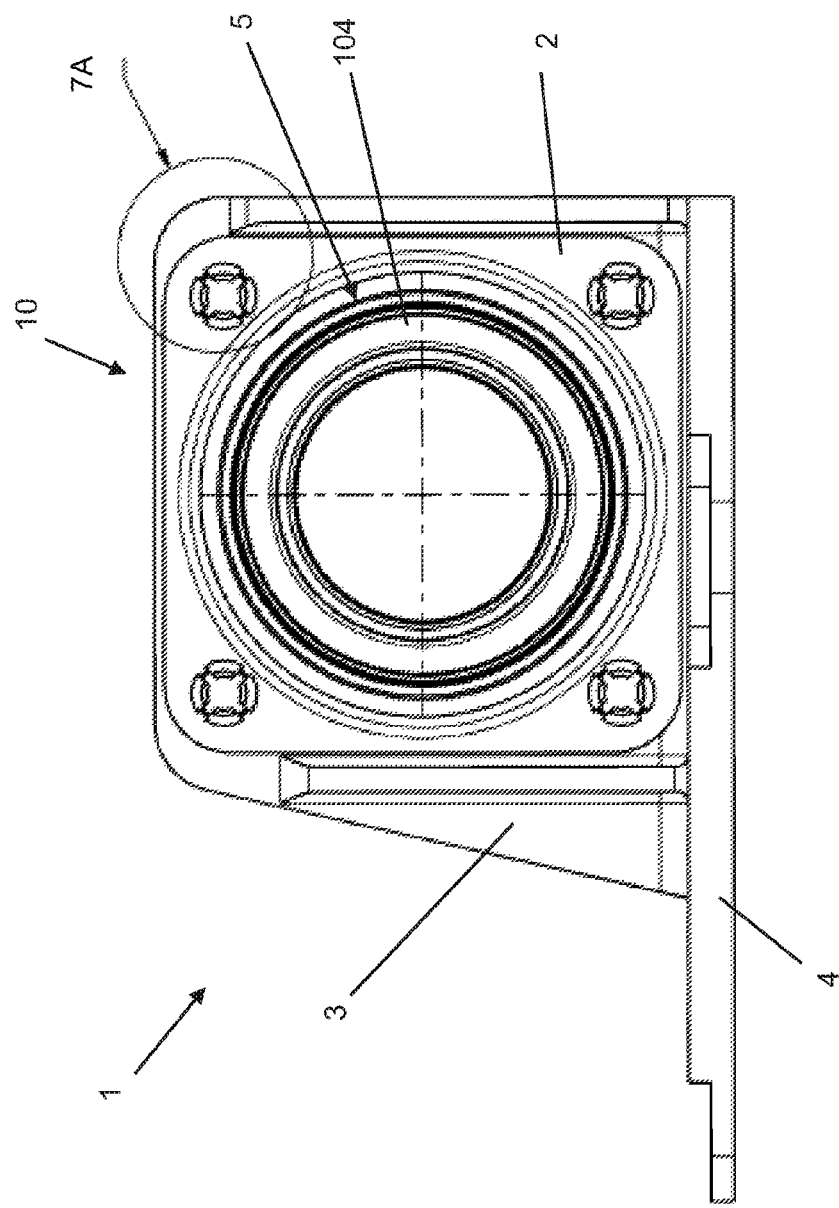
FIG. 5 is an elevational view of a shaft bearing arrangement with an alternate housing.
Figure 6:
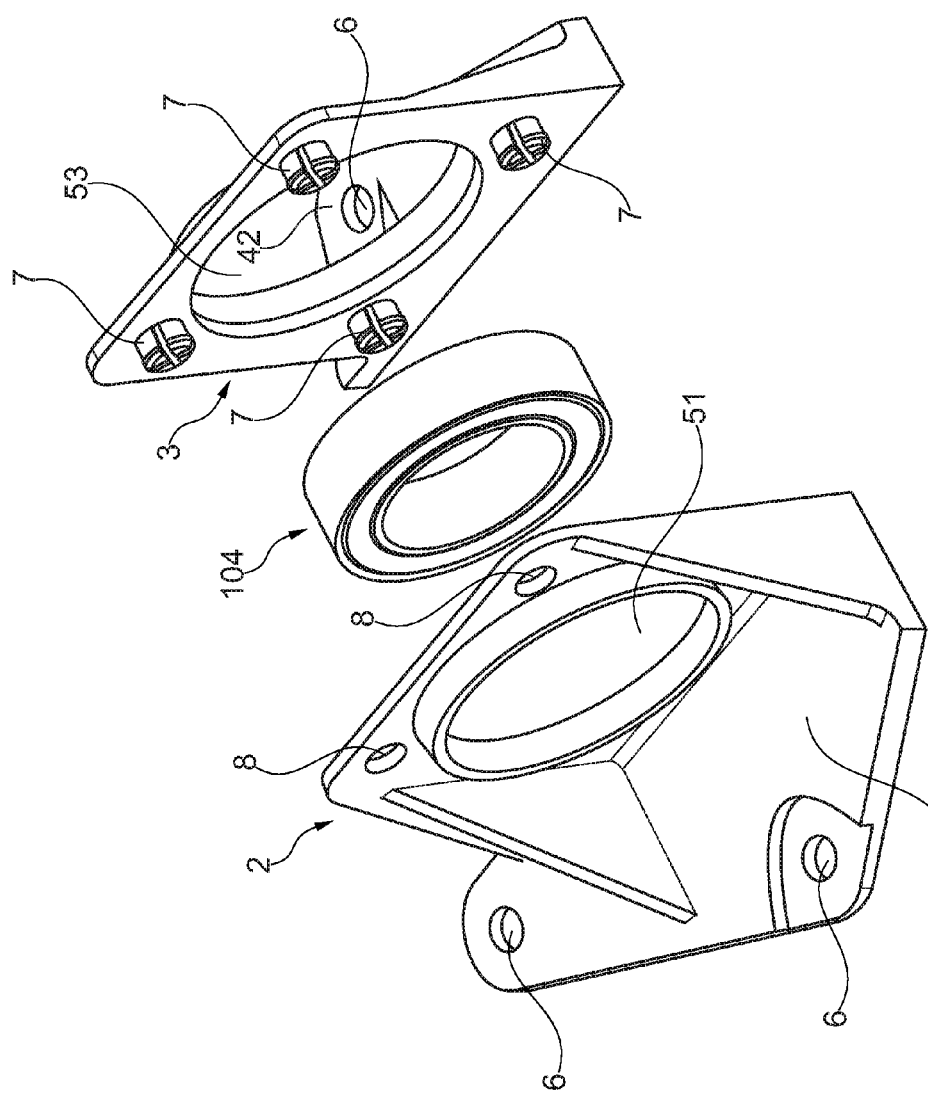
FIG. 6 is an exploded perspective view of the shaft bearing arrangement and housing of FIG. 5.
Figure 7A:
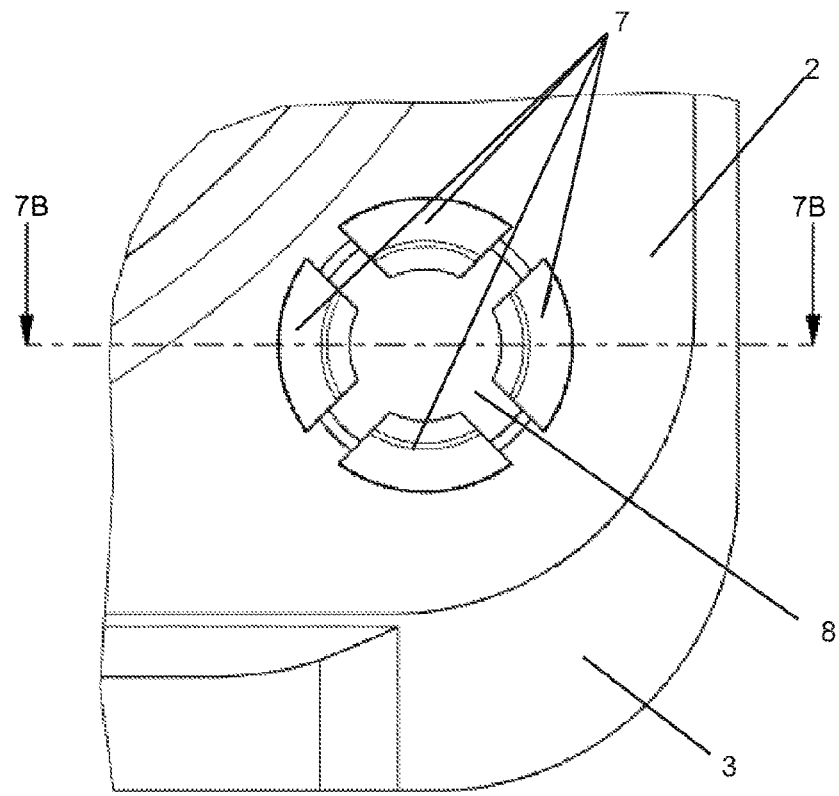
FIG. 7A is an enlarged detail view of section 7A from FIG. 5.
Figure 7B:
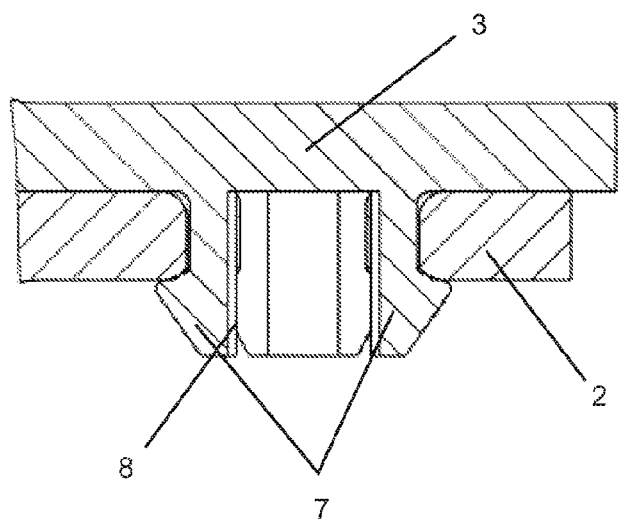
FIG. 7B is a cross-sectional view taken along line 7B-7B in FIG. 7A.

The first flange portion 2 has a first receiving portion 51 and the second flange portion has a second receiving portion 53, as shown in FIGS. 3 and 6. The first and second receiving portions 51; 53 complement each other when the two flange portions 2; 3 are connected and together form the receiving member 5 for the roller bearing 104.

The roller bearing 104 is arranged in a rotatable and/or pivotable manner in the receiving member 5.

The first and/or second receiving portion 51; 53 has/have at least partially and/or in regions a spherical and/or crown-like receiving contour 52; 54, as shown in FIGS. 3 and 6, so that the receiving member 5 in the connected state of the two flange portions 2; 3 has a spherical and/or crown-like overall receiving contour.

The housing 10 has a standing base 4, and the standing base 4 has at least one aperture and/or at least one recess 6 for introducing a securing element. The securing element is constructed to secure the housing 10 to a surrounding construction 9.

As shown in FIGS. 2, 3, 4A and 4B, only one of the flange portions 2; 3 may include the standing base 4.

Alternatively, as shown in FIGS. 5, 6, 7A and 7B, the standing base 4 can be constructed in two parts and has a first standing base portion 41 and a second standing base portion 42, and the first flange portion 2 comprises the first standing base portion 41 and the second flange portion 3 comprises the second standing base portion. The two standing base portions 41; 42 in the connected state of the flange portions 2; 3 are assembled to form the standing base 4.

The invention claimed is:

1. A drive train portion for a vehicle having a gearbox, a connection shaft, at least one joint, an additional connection shaft having a shaft bearing arrangement for the connection shaft, wherein the shaft bearing arrangement is arranged in a stationary manner with respect to the gearbox, wherein the connection shaft extends from the gearbox to the joint and is supported in the shaft bearing arrangement, the shaft bearing arrangement comprising:
   a housing in which a roller bearing is arranged, the housing comprises a first flange portion and a second flange portion,
   the first and second flange portions are connected to each other and together form a receiving member for the roller bearing,
   one of the flange portions has a securing interface and the other of the flange portions has a securing counter-interface, the securing interface comprises an axially extending projection having a hook portion, and the securing counter-interface comprising an axially extending opening defined in the other of the flange portions, the first and second flange portions are at least one of connected to each other or fixed to each other in a positive-locking manner by the securing interface and the securing counter-interface, the positive-locking connection prevents the two flange portions from becoming disengaged from each other in an axial projection direction with respect to a rotation axis of the roller bearing on the housing,
   the first and second flange portions are hooked to each other by the securing interface axially engaging the securing counter-interface with the hook portion engaging behind the axially extending opening, and the axially extending projection being radially fixed by the axially extending opening, and
   the housing comprises a plastics material.

2. The drive train portion as claimed in claim 1, wherein the securing interface is at least one of formed on or integrated in one of the flange portions and the securing counter-interface is at least one of formed on or integrated in the other flange portion.

3. The drive train portion as claimed in claim 1, wherein the first flange portion has a first receiving portion and the second flange portion has a second receiving portion, and the first and second receiving portions complement each other when the two flange portions are connected and together form the receiving member for the roller bearing.

4. The drive train portion as claimed in claim 1, wherein the roller bearing is arranged in at least one of a rotatable or pivotable manner in the receiving member.

5. The drive train portion as claimed in claim 4, wherein at least one of the first or second receiving portion has at least partially or in regions at least one of a spherical or crown-shaped receiving contour so that the receiving member in the connected state of the two flange portions has at least one of a spherical or crown-shaped overall receiving contour.

6. The drive train portion as claimed in claim 1, wherein the housing has a standing base, the standing base has at least one aperture or at least one recess or both for introducing a securing element, and the securing element is constructed to secure the housing to a surrounding construction.

7. The drive train portion as claimed in claim 6, wherein only one of the flange portions comprises the standing base.

8. The drive train portion as claimed in claim 6, wherein the standing base is constructed in two parts and has a first standing base portion and a second standing base portion, the first flange portion comprises the first standing base portion and the second flange portion comprises the second standing base portion, and the two standing base portions in the connected state of the flange portions are assembled to form the standing base.

* * * * *